United States Patent
Gadow et al.

(10) Patent No.: US 6,793,873 B2
(45) Date of Patent: Sep. 21, 2004

(54) MELTED-INFILTRATED FIBER-REINFORCED COMPOSITE CERAMIC

(75) Inventors: Rainer Gadow, Aschau am Inn (DE); Tilmann Haug, Uhldingen-Mühlhofen (DE); Andreas Kienzle, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/934,552

(22) Filed: Aug. 23, 2001

(65) Prior Publication Data

US 2002/0142146 A1 Oct. 3, 2002

Related U.S. Application Data

(63) Continuation of application No. 09/381,466, filed as application No. PCT/EP98/00951 on Feb. 19, 1998, now abandoned.

(30) Foreign Application Priority Data

Mar. 21, 1997 (DE) ......................................... 197 11 831

(51) Int. Cl.⁷ ................................................. B28B 1/00
(52) U.S. Cl. ...................... 264/646; 264/667; 264/345; 156/89.11; 156/169; 156/184
(58) Field of Search ................................. 264/29.2, 604, 264/646, 667, 231, 345, 649; 156/184, 89.11, 169; 419/19, 14

(56) References Cited

U.S. PATENT DOCUMENTS

| 5,079,195 A | 1/1992 | Chiang et al. |
| 6,193,928 B1 * | 2/2001 | Rauscher et al. ............. 419/45 |

FOREIGN PATENT DOCUMENTS

| EP | 0798280 A2 | 10/1997 |
| EP | 0968151 B1 | 1/2000 |
| JP | 57-135776 | 8/1982 |
| JP | 3-177384 | 8/1991 |
| JP | 4-358031 | 12/1992 |

* cited by examiner

Primary Examiner—Merrick Dixon
(74) Attorney, Agent, or Firm—Crowell & Moring LLP

(57) ABSTRACT

A melt-infiltrated, fiber-reinforced composite ceramic containing high-temperature-resistant fibers, in particular fibers based on Si/C/B/N, which are reaction-bonded to a matrix based on Si and also a process for producing such a composite ceramic are described. The silicon melt which is used for the melt infiltration contains additions of iron, chromium, titanium, molybdenum, nickel or aluminum, with particular preference being given to a silicon melt containing from about 5 to 50% by weight of iron and from about 1 to 10% by weight of chromium. This gives a simplified production process compared with conventional silicon melt infiltration and improved properties of the composite ceramic (FIG. 1).

35 Claims, 3 Drawing Sheets

MELTED-INFILTRATED FIBER-REINFORCED COMPOSITE CERAMIC

BACKGROUND OF THE INVENTION

This application is a continuation of application Ser. No. 09/381,466, filed Dec. 28, 1999, now abandoned, which is a National Stage of PCT/EP98/00951, filed on Feb. 19, 1998.

The invention relates to a melt-infiltrated fibre-reinforced composite ceramic containing high-temperature-resistant fibres, in particular fibres based on Si/C/B/N, which are reaction-bonded to a matrix based on Si, and also to a process for producing such a composite ceramic.

Such a process and such a composite ceramic are known from U.S. Pat. No. 5,464,655.

Carbon fibre-reinforced carbon (C/C, also known as CFRC or in German language usage as CFC) is the first industrially successful development in the group consisting of fibre-reinforced composite ceramic materials.

Recently developed high-performance brake systems based on CFRC brake discs with specially developed friction linings, as are used, for instance, in motor racing, can only be produced using numerous impregnation or carbonization and graphitization cycles, so that the production process is extremely time-consuming, energy-intensive and costly and can take a number of weeks or months. In addition, CFRC brake discs have totally unsatisfactory braking properties for use in production vehicles which are not subjected to demanding operating conditions in the presence of moisture and at low temperatures. This manifests itself, inter alia, in decidedly non-constant coefficients of friction as a function of the operating temperature and the surface lining which makes regulation, as has hitherto been customary in 4-channel ABS systems, extraordinarily difficult or even impossible. In view of this background, attempts are being made to develop improved fibre-reinforced composite ceramic materials which can be used, for example, as brake discs for high-performance brake systems in motor vehicles or in railway vehicles. Furthermore, such fibre-reinforced composite ceramic materials are also of interest for numerous other applications, for instance as turbine materials or as materials for sliding bearings.

Although silicon-infiltrated reaction-bonded silicon carbide (SiSiC) containing from 2 to 15% by mass of free silicon has been known since the 1960s and has also been introduced commercially for some applications in heat engineering. Problems in respect of internal stresses (internal stress due to cooling) occur in the manufacture of large and thick-walled components because of a step increase in the volume of the semimetallic silicon when it solidifies in the microstructure of the material. The stressing of the solidified silicon manifests itself, in many cases, in the formation of microcracks and in a reduction in adhesion at internal interfaces, so that the strength of the material is reduced and critical crack propagation under cyclic thermal and mechanical stress can be expected, particularly during prolonged use. In manufacture, the volume expansion on solidification leads to difficulties as have long been known when, for instance, water freezes in closed line systems, i.e. to rupture and breaking of the components and thus to high reject rates. In addition, the manufacture of SiSiC materials is relatively complicated and expensive.

It is therefore an object of the invention to provide an improved fibre-reinforced composite ceramic containing high-temperature-resistant fibres and also a process for producing such a composite ceramic, which makes possible very simple and inexpensive production of mass-produced components such as brake discs, with high thermal stability and hot strength together with sufficient oxidation resistance and thermal shock resistance being prerequisites.

The object of the invention is achieved by, in a melt-infiltrated fibre-reinforced composite ceramic of the type described at the outset, the matrix containing additions of iron, chromium, titanium, molybdenum, nickel or aluminium.

The object of the invention is completely achieved in this manner. According to the invention, it has been recognized that alloying the silicon melt used for the melt infiltration with iron, chromium, titanium, molybdenum, nickel and/or aluminium reduces or even substantially avoids the step increase in volume on solidification of a pure silicon melt. In this way, the problems caused by the stressing of the solidified silicon are avoided, a higher strength, particularly with regard to cyclic thermal and mechanical stress, is achieved and at the same time the production process is simpler and less costly.

SUMMARY OF THE INVENTION

It is thus possible, according to the invention, to obtain a reaction-bonded, melt-infiltrated SiC ceramic (RB-SiC) in which the brittle Si as is present in hitherto customary RB-SiC ceramics is replaced by a phase enriched with Fe and/or Cr, Ti, Mo, Ni or Al, which leads to a significant increase in strength and ductility of the ceramic.

In an advantageous embodiment of the invention, the matrix contains at least additions of iron.

This measure makes it possible, in a particularly inexpensive and environmentally friendly manner, to avoid the volume increase which occurs in the case of pure silicon and the additions of iron at the same time lead to improved braking performance in an application as a brake disc, since an improved friction pairing is obtained with conventional brake linings which are matched to brake discs based on grey cast iron. Brake systems based on such brake discs are thus more readily regulated since, in addition, they are less moisture-sensitive and are insensitive to low temperatures. Furthermore, there are no critical contact pressures which have an adverse effect on regulatability, as in the case of CFRC brake discs. In addition, the production process is simplified and made cheaper by the lowering of the melting point of the silicon melt by the addition of iron.

However, additions of chromium, titanium, molybdenum, nickel or aluminium in a two-material system with silicon also allows the above-mentioned volume increase on solidification of a pure silicon melt to be avoided or at least reduced. Furthermore, there is, in most cases, a lowering of the melting point which makes manufacture simpler and cheaper. Moreover, additions of chromium, titanium, molybdenum, nickel or aluminium can effect the formation of passive layers, so that the oxidation and corrosion resistance is improved.

For this reason, in a further embodiment of the invention, preference is given to adding further additions of chromium, titanium, aluminium, nickel or molybdenum in a suitable ratio as passive layer formers to a matrix based on Si which contains additions of iron.

In this case, different coefficients of thermal expansion of the alloying components lead to stress states in the matrix which compensate for the stresses caused by the fibres on cooling.

In a further embodiment of the invention, the matrix is produced from a silicon alloy containing from 0.5 to 80% by weight of iron, preferably from about 5 to 50% by weight (based on the total mass of the alloy). Since ferrosilicon in comparatively pure form is used on an industrial scale in steel production, with grades having the compositions Fe25Si75 and Fe35Si65 being commercially available, a considerable reduction in the raw material costs compared with the use of pure silicon is achieved. Furthermore, there is a lowering of the melting point from about 1410° C. for pure silicon to about 1340° C. when Fe25Si75 is used and to about 1275° C. when Fe35Si65 is used.

In an additional embodiment of the invention, an additional 5–30% by weight of chromium, preferably about 7–12% by weight of chromium, based on the iron content, is added to the silicon melt which is used for melt infiltration.

This change to a three-material system consisting of Si—Fe—Cr enables the iron-containing phases of the composite ceramic to be protected against corrosion and at the same time allows the melting point to be lowered to less than 1400° C. For this purpose, it is useful to add at least about 7% by weight of chromium (based on the iron content), since from about 7 to 8% by weight of chromium is necessary to effect the formation of a passive layer of chromium(III) oxide, as is known from stainless steels. (Based on the total mass of the alloy, the proportion by weight of chromium is preferably from about 1 to 30% by weight, preferably from about 1 to 10% by weight.) However, for cost reasons it is preferable to select a chromium content which is not unnecessarily high. Although the corresponding metallic starting materials in the form of chromium-containing alloys (e.g. FeCr) are slightly more expensive than iron silicides such as FeSi ir FeSi$_2$, they give considerable advantages as a result of the improved oxidation resistance.

Fibres which are suitable for the fibre reinforcement include numerous high-temperature-resistant fibres, in particular fibres based on Si/C/B/N and having covalent bonds, with C fibres and SiC fibres being among the best known fibres which are suitable for the ceramics of the invention. In addition, use of, for instance, aluminium oxide fibres is also conceivable for particularly inexpensive products.

In an additional embodiment of the invention, the fibres are combined to form fibres bundles and are surface-impregnated.

In this way, commercially available rovings and multifilament strands (e.g. 12K bundles) can be used. These are advantageously impregnated on their surface, e.g. by means of pitch, to protect the fibre bundles against mechanical damage during production and to avoid excessive reaction and thus damage during the silicon infiltration by forming a carbon layer which can react to form SiC and thus protect the fibres.

In a further advantageous embodiment of the invention, the fibres are collected together to form short fibre bundles and can comprise, for example, C filaments having mean diameters of from about 5 to 12 $\mu$m and a length of from about 2 to 10 mm which are collected together to form fibre bundles containing from about 3000 to 14,000 filaments.

Such chopped carbon fibre bundles which are used f or short-fibre reinforcement allow simplified production of a shaped body by pressing methods without costly lamination and post-impregnation having to be carried out. This makes possible inexpensive mass production and the parameters can be set so that virtually no shrinkage occurs and only minimal final machining, for example by grinding, of the finished components is necessary ("near net shape manufacture").

As regards the process, the object of the invention is achieved by a process for producing a fibre-reinforced composite ceramic containing high-temperature-resistant fibres, in particular fibres based on Si/C/B/N, which are reaction-bonded to a matrix based on Si, which comprises the following steps:
production of a green body from fibres using binders and fillers by winding, lamination or pressing;
pyrolysis of the green body under reduced pressure or protective gas in a temperature range from about 800° C. to 1200° C. to produce a porous shaped body;
infiltration of the carbonized shaped body with a silicon melt which contains additions of iron, chromium, titanium, molybdenum, nickel or aluminium.

As explained above, the volume increase which occurs when using pure silicon for the melt infiltration (about 10% by volume) can be considerably reduced or even avoided by means of such additions, so that a material having improved properties is obtained by a simplified and cheaper production process.

The internal stresses which occur in conventional fibre-reinforced, reaction-bonded SiC materials (RB—SiC) and lead to numerous reject parts during manufacture are reduced or largely avoided in this way. In a preferred embodiment of the invention, additions of iron and, if desired, of chromium, titanium, aluminium, nickel or molybdenum as passive layer former are mixed in suitable mixing ratios into the silicon melt.

Iron additions in the range from about 0.5 to 80% by weight of iron, preferably from about 5 to 50% by weight of iron, and, if desired, chromium additions of from 0.03 to 40% by weight of chromium, preferably from 1 to 30% by weight of chromium, in particular from about 2 to 10% by weight of chromium (based on the total mass of the alloy), give particularly advantageous properties, a favourable reduction in the melting point and a considerable improvement in the oxidation resistance of the iron-containing phases by formation of a passive chromium oxide layer. The above-mentioned data are in each case based on the total weight of the final product.

As fibres for the production of the composite ceramic, it is possible to use any high-temperature-resistant fibres, in particular fibres based on Si/C/B/N having covalent bonding, but C fibres or SiC fibres which are collected together to form fibre bundles and are surface-impregnated are among the technologically proven and commercially available fibres which, particularly when used in the form of short fibre bundles comprising from about 3000 to 14,000 filaments having mean diameters of from about 5 to 12 Am and a length of from about 2 to 10 mm, preferably from about 3 to 6 mm, at a diameter of the fibre bundles of about 0.1 mm, can be employed advantageously.

The green bodies from which the porous shaped bodies are produced in the subsequent pyrolysis are, in an additional embodiment of the invention, produced by dry pressing or hot flow moulding of a granulated material which is obtained, in order to be particularly gentle with the fibres, by pan granulation.

Pan granulation allows the mechanically sensitive fibre bundles to be agglomerated with the other additives to produce a green body in a particularly gentle and relatively inexpensive way and at the same time achieves a good uniform distribution.

The pan granulation can be carried out continuously or batchwise, with the process preferably being controlled to produce a mean particle size of from about 2 to 6 mm.

In the production of the granulated material, SiC powder, silicides and carbon-containing fillers, preferably carbon black and/or graphite, are added in a further advantageous embodiment of the invention.

Here, the preferred procedure is first to premix a dry mixture of short-fibre bundles and fillers and subsequently to mix this with binders and further dissolved or dispersed additives in a pelletizing pan to produce the granulated material.

It has been found to be advantageous to produce the granulated material from about 20–60% by weight of SiC powder, about 2–20% by weight of carbon in the form of graphite powder and/or carbon black, and about 10–40% by weight of C fibre bundles (12K bundles) which are premixed dry and to which about 15–40% by weight of a binder solution, based on the total initial charge of solid materials, are added in a pelletizing pan.

Here, an aqueous binder solution containing from about 0.01 to 10% by weight of methylcellulose esters and polyvinyl alcohol has been found to be a suitable binder.

In an advantageous embodiment of the invention, the granulated material is, after it has been produced, first dried, preferably to residual moisture contents of less than 10% by weight of water, and then pressed to form green bodies.

A texture which may be obtained in the pressing procedure has, if the die is configured appropriately, an advantageous effect, for instance for use as a brake disc, since the C fibre bundles are preferentially aligned parallel to the flat surface of a flat disc, which also corresponds to the main stress direction.

In a preferred embodiment of the invention, such green bodies are then heated to from about 950 to 1050° C. under a protective gas atmosphere in a pyrolysis furnace or a vacuum reaction-sintering furnace to produce porous shaped bodies, preferably having a porosity of from about 10 to 50%, for a subsequent melt infiltration.

The melt infiltration which follows is preferably carried out using a silicon melt containing from about 10 to 50% by weight of iron and from about 0.5 to 10% by weight of chromium with the balance being silicon (based on the proportions by weight in the alloy).

Overall, this gives a reproducible and inexpensive manufacturing process which is suitable for mass production. Since virtually no shrinkage and internal stresses due to cooling occur, a significantly lower reject rate than in the case of conventional RB—SiC ceramics is achieved and the need for final machining is considerably reduced, particularly in the case of iron-rich phases in the microstructure.

It will be self-evident to those skilled in the art that the features mentioned above and the features still to be described below can be used not only in the combination indicated in each case, but also in other combinations or alone without going outside the scope of the present invention.

In particular, it may be mentioned that the process of pan granulation is suitable not only for producing melt-infiltrated fibre-reinforced composite ceramics containing high-temperature-resistant ceramic fibres which are reaction-bonded to a matrix based on Si and containing additions of iron, chromium, titanium, molybdenum, nickel or aluminium, but can also be used with considerable advantage for producing such composite ceramics in which a pure silicon melt is used for melt infiltration.

BRIEF DESCRIPTION OF THE DRAWINGS

Further features and advantages of the invention may be found in the following description of preferred illustrative embodiments with reference to the drawing.

In the drawing.

DETAILED DESCRIPTION OF THE INVENTION

Figure 1:
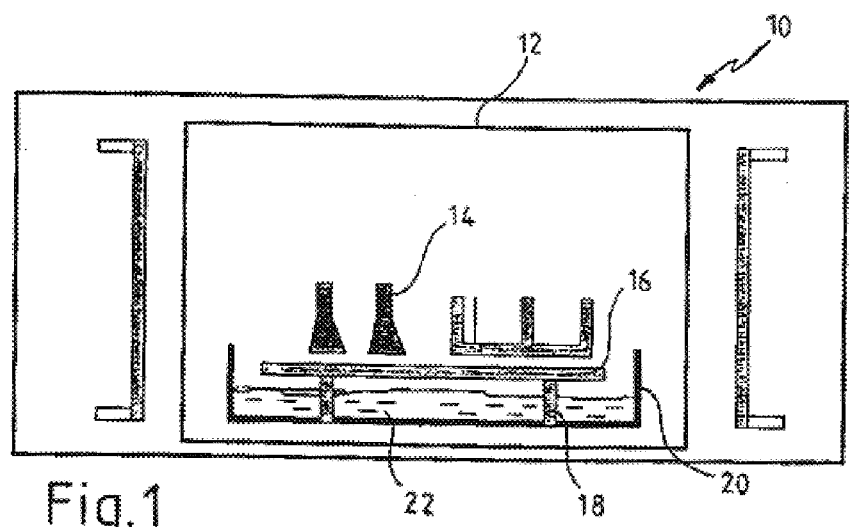
FIG. 1 schematically shows a reaction-sintering furnace for melt infiltration.

A distinguishing aspect of the process of the invention is that the final step for producing the fibre-reinforced composite ceramic, namely the melt infiltration, is not carried out using a pure silicon melt as in the prior art, but instead additions of iron, chromium, titanium, molybdenum, nickel and/or aluminium are added to the melt.

Independently of this, the porous shaped body which is impregnated with liquid metal in the melt infiltration can be produced in various ways.

The process of the invention thus makes possible the infiltration of C hard felts and other fibre composites and also the production of ceramics reinforced 2- and 3-dimensionally with continuous fibres.

The shaped bodies can thus be produced, for instance, by known lamination techniques, for example using synthetic resins, or else by pressing processes, with the green bodies being converted by pyrolysis into porous shaped bodies, in particular C-bonded shaped bodies, which are permeated by a complete pore network and thus, in the subsequent melt infiltration, draw in the liquid melt by means of the capillary forces within the porous shaped body, in a similar manner to a wick or sponge.

Apart from the conventional lamination technique which, as described above, can be used for carrying out the invention, particular preference is given according to the invention to a pan granulation process for producing short-fibre-reinforced melt-infiltrated composite ceramics.

The following description of the process variants for producing shaped bodies thus relates only to the production of short-fibre ceramics. However, it should be stated that it is also possible to use, as an alternative, conventional lamination methods.

EXAMPLE 1

The starting materials used are summarized in Table 1.

TABLE 1

| Compound | Designation | Source | Data |
|---|---|---|---|
| SiC | SM93 | Industriekeramik high-purity | $S_M03:3.1\ m^2/g$ |
| Carbon black | Printex 140 U | Degussa | |
| Graphite | KS 6 | Timcal | |
| Short C fibre bundles | | SGL carbon | 3mm, 12,000 fil. |
| Methylcellulose ester | Tylose 4000 G4 | Hoechst | |
| Polyvinyl alcohol | Moviol 10–74 | Hoechst | |

TABLE 1-continued

| Compound | Designation | Source | Data |
|---|---|---|---|
| FeSi (65 or 75) | FeSi75 or FeSi65 | FESIL | Grain size: 5–30 mm |
| FeCr (65% by mass of Cr) | Ferrochromaffine | FESIL | Grain size: 5–30 mm |

1.1 Pan Granulation

In a tumble mixer, 344 g of SiC powder, 48 g of graphite powder and 8 g of carbon black were intensively mixed at 50 rpm for three hours. Subsequently, 200 g of pitch-coated short C fibre bundles were added and mixed into the powder mixture for 5 minutes at 10 rpm. This mixture was transferred to a pelletizing pan 24 as shown in FIGS. 2 and 3 and subjected to a rolling-mixing motion at 30 rpm and a pan inclination angle of about 40°. 240 g of the aqueous binder solution as per Table 1 consisting of 1% by weight of Tylose 4000 G4 and 0.5% by weight of Moviol 10–74 dissolved in demineralized water were sprayed in via nozzles from spray lines 36 for a period of 3 minutes.

Figures 2, 3:
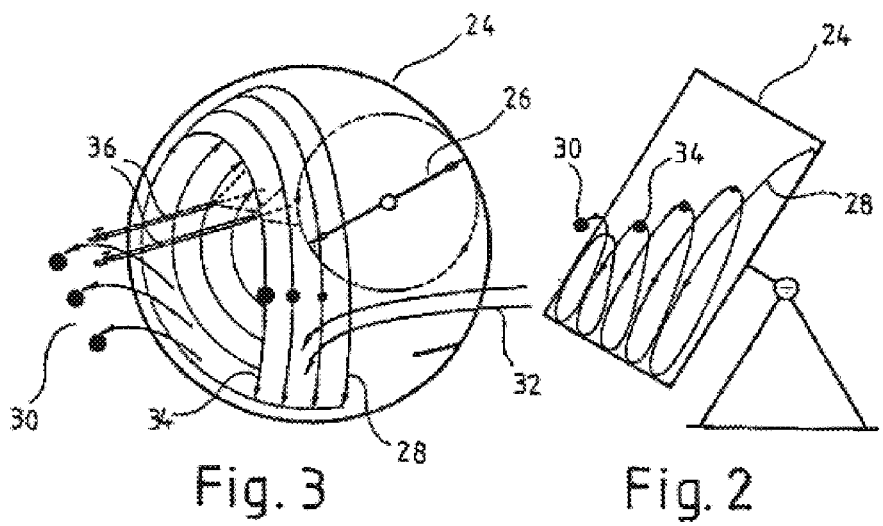
FIG. 2 schematically shows a pelletizing pan which is used for pan granulation, with the path of individual particles being indicated.
FIG. 3 shows a plan view of the pelletizing pan of FIG. 2 from the front side.

In FIGS. 2 and 3, the paths of small particles are indicated schematically by 28 and those of larger particles are indicated schematically by 34. Additional mixing can be achieved by means of an additional mixing pan 26 as shown in FIG. 3. In this method of pan granulation, the distribution of the components in the granulated material being formed and also the granule size can be influenced by varying various parameters such as rotational speed and angle of inclination of the pelletizing pan 24, rotational speed of the additional mixing pan 26, location of the spray nozzles for introduction of the binder solution, type and amount of binder solution added, etc.

Overall, the pan granulation can be adjusted so that granule formation which is gentle on the carbon fibre bundles is obtained together with a uniform, homogeneous distribution of the individual components. The granulated material produced preferably has a particle size of from about 3 to 6 mm.

The pan granulation can be carried out either batchwise, in which case the granulated material obtained is subsequently sieved to obtain the desired particle size fraction, or else can be carried out continuously as shown in FIG. 3. In this variant, dry mix is continuously introduced as indicated by the reference numeral 32 and binder solution is sprayed in via the lines 36 and, at the same time, finished granulated material is discharged continuously in the region 30 of the pelletizing pan.

The granulated material formed in this way was dried to a moisture content of less than 10%.

1.2. Shaping 56.9 g of the granulated material were transferred to a pressing die having a diameter of 60 mm and pressed to a height of 13.6 mm by means of a hydraulic press using a pressure of 20 MPa. This gave a mechanically stable green body which could be transported.

1.3. Pyrolysis

The green body obtained above was taken from the pressing die, transferred to a pyrolysis furnace and heated at a rate of 10 K/min to 1000° C. under a nitrogen atmosphere. In the pyrolysis, the organic binder constituents were degraded to carbon. The resulting porous shaped body had a weight of 55.8 g and a porosity of 39%.

1.4. Melt Infiltration

A carbonized shaped body as obtained in section 1.3 and having a mass of 20 g was transferred to a graphite crucible coated with boron nitride, covered with 22 g of a granulated FeSi alloy consisting of 75% by weight of Si and 25% by weight of Fe and heated at 10 K/min to 1550° C. under reduced pressure. This temperature was held for 30 minutes and the crucible was then cooled to room temperature.

This procedure gave a dense, crack- and pore-free shaped body having a density of 3.1 g/cm$^3$ whose external geometric dimensions corresponded to those of the shaped body initially placed in the crucible.

Instead of placing the shaped body directly in a graphite crucible 20 coated with boron nitride, an alternative possibility is, as shown in FIG. 1, to use a porous SiC charging plate 16 in the furnace chamber 12 of a reaction-sintering furnace 10; this SiC charging plate 16 stands on feet 18 in the melt 22 of the graphite crucible 20 coated with boron nitride or is connected therewith via porous wicks. In this variant, a larger amount of granulated material for producing the melt 22 can be introduced into the crucible 20 since the melt 22 rises from below through the porous feet 18 and the porous charging plate 16 into the shaped body 14.

EXAMPLE 2

A green body was produced as described above by pan granulation and subsequent pressing and subjected to pyrolysis in the above-described manner in a pyrolysis furnace.

The shaped body obtained in this way and having a mass of 20 g was again transferred to a graphite crucible coated with boron nitride, covered with 22 g of a mixture of 19 g of a granulated FeSi alloy consisting of 75% by weight of Si and 25% by weight of Fe to which 3 g of granulated FeCr (65% by weight of chromium) had been added and the crucible was heated at 10 K/min to 1700° C. under reduced pressure. This temperature was held for 30 minutes. The crucible was then cooled to room temperature.

This procedure gave a dense, crack- and pore-free shaped body having a density of 3.2 g/cm$^3$ whose external geometric dimensions corresponded to those of the shaped body initially placed in the crucible.

Figure 4:
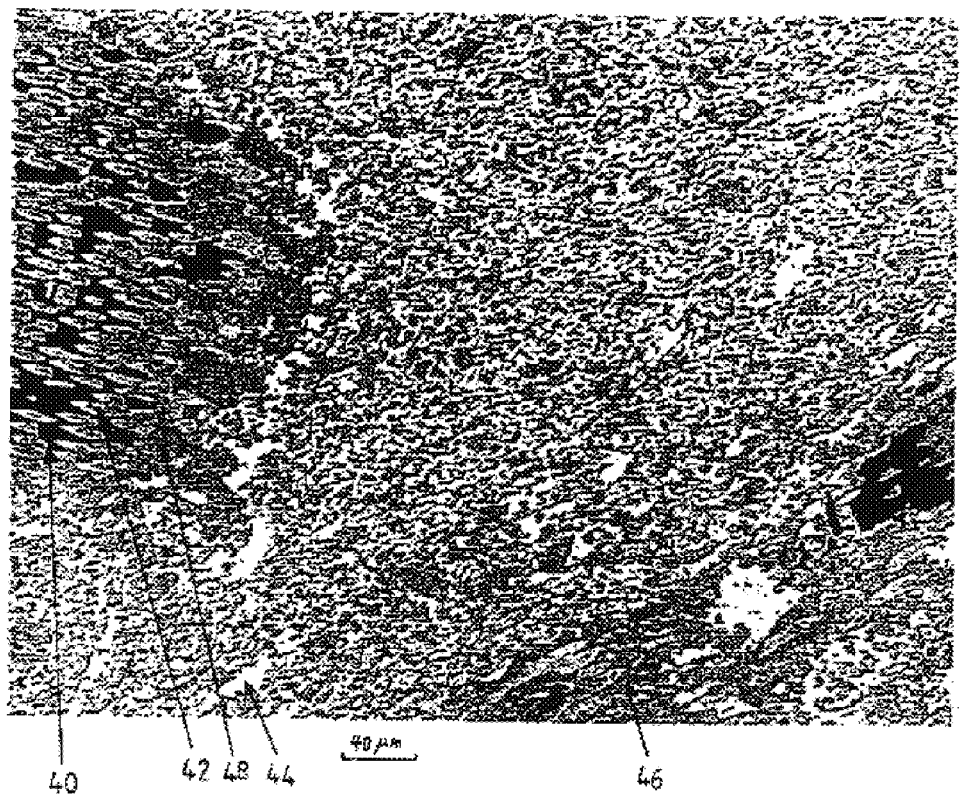
FIG. 4 shows an optical micrograph of the microstructure of a composite ceramic according to the invention and FIG. 5 shows an enlarged section of the microstructure shown in FIG. 4.
Figure 5:
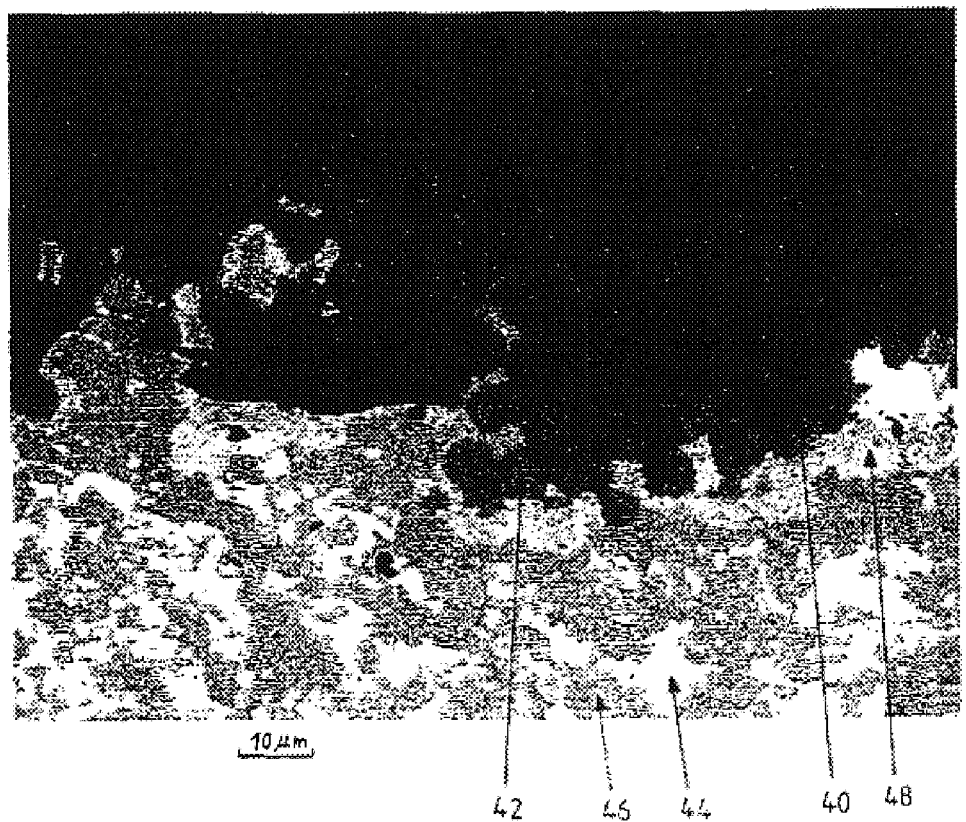

FIGS. 4 and 5 show optical micrographs of polished sections of specimens which were produced as described in Example 1.

In FIG. 4, a C fibre bundle can be seen in the left-hand half of the picture while part of the next C fibre bundle is visible at the bottom right-hand corner of the picture. The numeral 40 denotes carbon formed by pyrolysis while the numeral 42 denotes C fibres. Secondary SiC formed from the reaction of carbon fibres with silicon is present at the edge of the C fibre bundle; this secondary SiC is denoted by the numeral 48.

The light-coloured phase denoted by the numeral 44 is silicon or Si/Fe/Cr. The dark grey phase denoted by 46 is SiC.

In the enlarged view shown in FIG. 5, in which a carbon fibre bundle is cut virtually perpendicularly across, the individual C fibres can readily be seen. The secondary SiC which has been formed from the reaction of C fibres and is denoted by the numeral 48 can also be readily seen.

It can easily be seen that the carbon fibre bundle is retained virtually unscathed and only a few of the C fibres in the outer region have been converted into secondary SiC.

This explains the considerable increase in strength which is achieved by the gentle treatment of the C fibre bundles in the pan granulation and in the subsequent process steps.

What is claimed is:

1. A process for producing a fibre-reinforced composite ceramic comprising high-temperature-resistant fibres reaction-bonded to a matrix, comprising the following steps:

producing a green body from fibres, binders and fillers by at least one step selected from he group consisting of winding, lamination, pressing, and hot flow molding;

pyrolysing the green body under reduced pressure or protective gas in a temperature range from about 800° C. to 1200° to produce a porous shaped body; and infiltrating the porous shaped body with a silicon melt which comprises silicon and iron.

2. The process of claim 1, wherein the high-temperature-resistant fibres comprise Si/C/B/N.

3. The process of claim 1, wherein the silicon melt further comprises chromium, titanium, aluminium, nickel or molybdenum or a combination of chromium with titanium, aluminium, nickel or molybdenum as passive layer formers.

4. The process of claim 1, wherein the silicon melt contains from 0.5 to 80% by weight of iron.

5. The process of claim 3, wherein the silicon melt contains from 0.5 to 80% by weight of iron.

6. The process of claim 4, wherein the silicon melt contains from 5 to 50% by weight of iron.

7. The process of claim 5, wherein the silicon melt contains from 5 to 50% by weight of iron.

8. The process of claim 7, wherein the silicon melt contains from 0.03 to 40% by weight of chromium.

9. The process of claim 8, wherein the silicon melt contains from 1 to 40% by weight of chromium.

10. The process of claim 9, wherein the silicon melt contains from 1 to 10% by weight of chromium.

11. The process according of claim 4, wherein the fibres used are C fibres or SiC fibres.

12. The process of claim 4, wherein the fibres are collected together to form fibre bundles and are surface-impregnated with pitch.

13. The process of claim 12, wherein the fibres bundles are short-fibre bundles.

14. The process of claim 13, wherein the fibre bundles used e formed by from about 3000 to 14,000 C filaments having mean diameters of from about 5 to 10 $\mu$m and a length of from about 2 to 10 mm.

15. The process of claim 13, wherein the green body is produced by:

forming a granulated material from the fibres, binders, and fillers and;

dry pressing or hot flow molding of the granulated material.

16. The process of claim 14, wherein the green body is produced by:

forming a granulated material from the fibres, binders, and fillers and;

dry pressing or hot flow molding of the granulated material.

17. The process of claim 15, wherein the granulated material is produced by pan granulation.

18. The process of claim 16, wherein the granulated material is produced by pan granulation.

19. The process of claim 17, in which the granulated material is produced continuously or batchwise and has a mean particle size of from about 2 to 6 mm.

20. The process of claim 18, in which the granulated material is produced continuously or batchwise and has a mean particle size of from about 2 to 6 mm.

21. The process of claim 1, wherein carbon-containing fillers are added in the production of green body.

22. The process of claim 21, wherein the carbon-containing fillers comprise carbon black or graphite.

23. The process of claim 1, wherein the fillers in the form of silicides are added in the production of the green body.

24. The process of claim 17, wherein a dry mixture of short-fibre bundles and fillers is first premixed and is subsequently mixed with binders in a pelletizing pan to produce the granulated material.

25. The process of claim 18, wherein a dry mixture of short-fibre bundles and fillers is first premixed and is subsequently mixed with binders in a pelletizing pan to produce the granulated material.

26. The process of claim 22, wherein the granulated material is produced from about 20–60% by weight of SiC powder, about 2–20% by weight of carbon in the form of graphite powder or carbon black, about 10–40% by weight of C fibre bundles (12K bundles) and about 15–40% by weight of a binder solution, with the latter being sprayed into a pelletizing pan.

27. The process of claim 25, wherein the granulated material is produced from about 20–60% by weight of SiC powder, about 2–20% by weight of carbon in the form of graphite powder or carbon black, about 10–40% by weight of C fibre bundles (12K bundles) and about 15–40% by weight of a binder solution, with the latter being sprayed into a pelletizing pan.

28. The process of claim 26, wherein the binder solution is an aqueous binder solution containing from 0.01 to 10% by weight of methylcellulose esters and polyvinyl alcohol.

29. The process of claim 22, wherein the binder solution is an aqueous binder solution containing from 0.01 to 10% by weight of methylcellulose esters and polyvinyl alcohol.

30. The process of claim 17, wherein the granulated material is dried after it has been produced and is subsequently pressed to for the green body.

31. The process of claim 18, wherein the granulated material is dried after it has been produced and is subsequently pressed to for the green body.

32. The process of claim 1, wherein the green body is heated to from about 950 to 1050° C. under a nitrogen atmosphere in a pyrolysis furnace to produce the porous shaped body.

33. The process of claim 1, wherein the green body is converted in the pyrolysis into a shaped body having a porosity of from about 30 to 50%.

34. The process of claim 1, wherein the porous shaped body infiltrated with a silicon melt containing from about 10 to 50% by weight of iron with the balance being silicon.

35. The process of claim 3, wherein the porous shaped body is infiltrated with a silicon melt containing from about 10 to 50% by weight of iron, from 0.5 to 10% by weight of chromium and silicon as the balance.

* * * * *